United States Patent Office 3,523,598
Patented Aug. 11, 1970

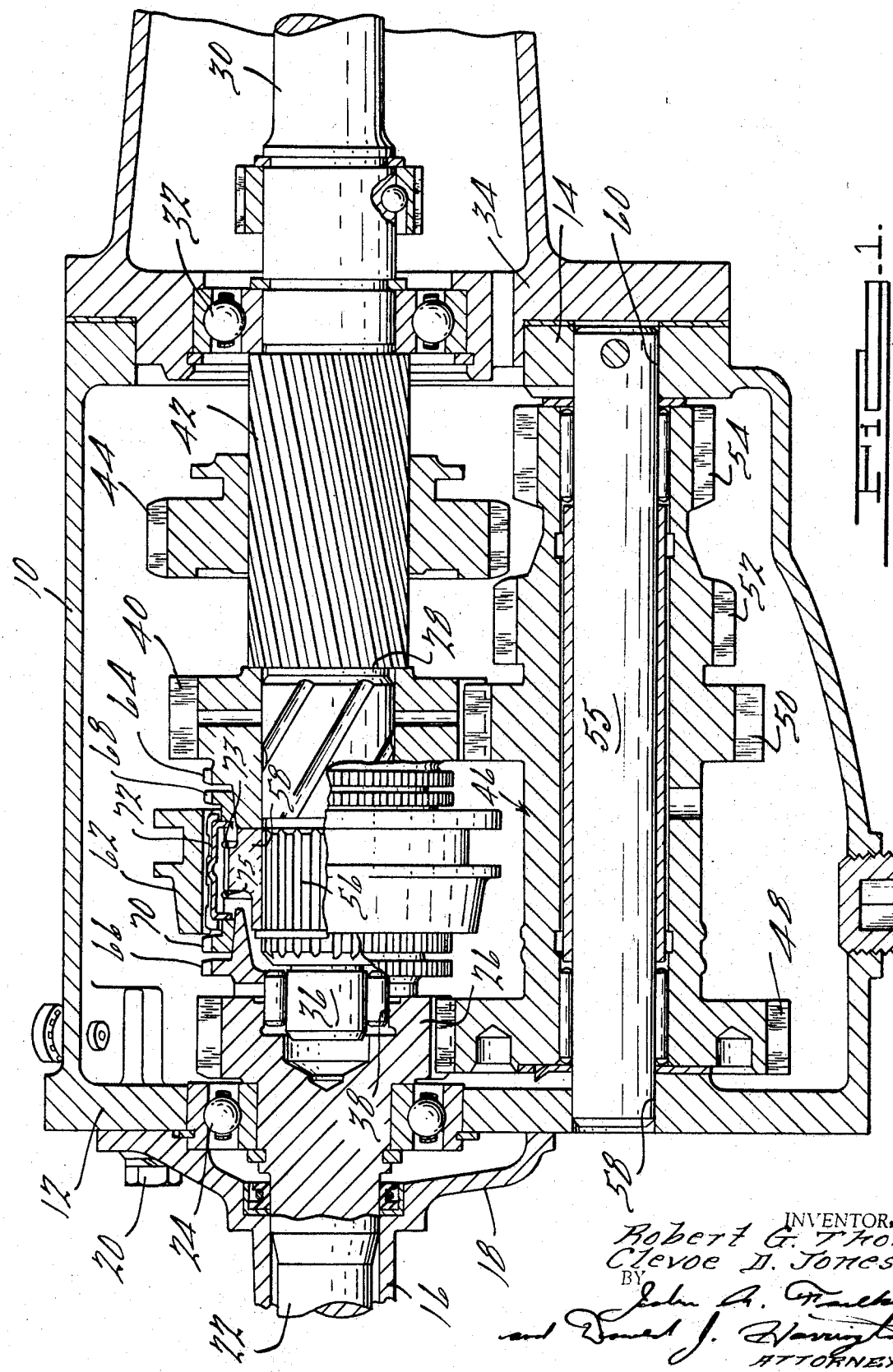

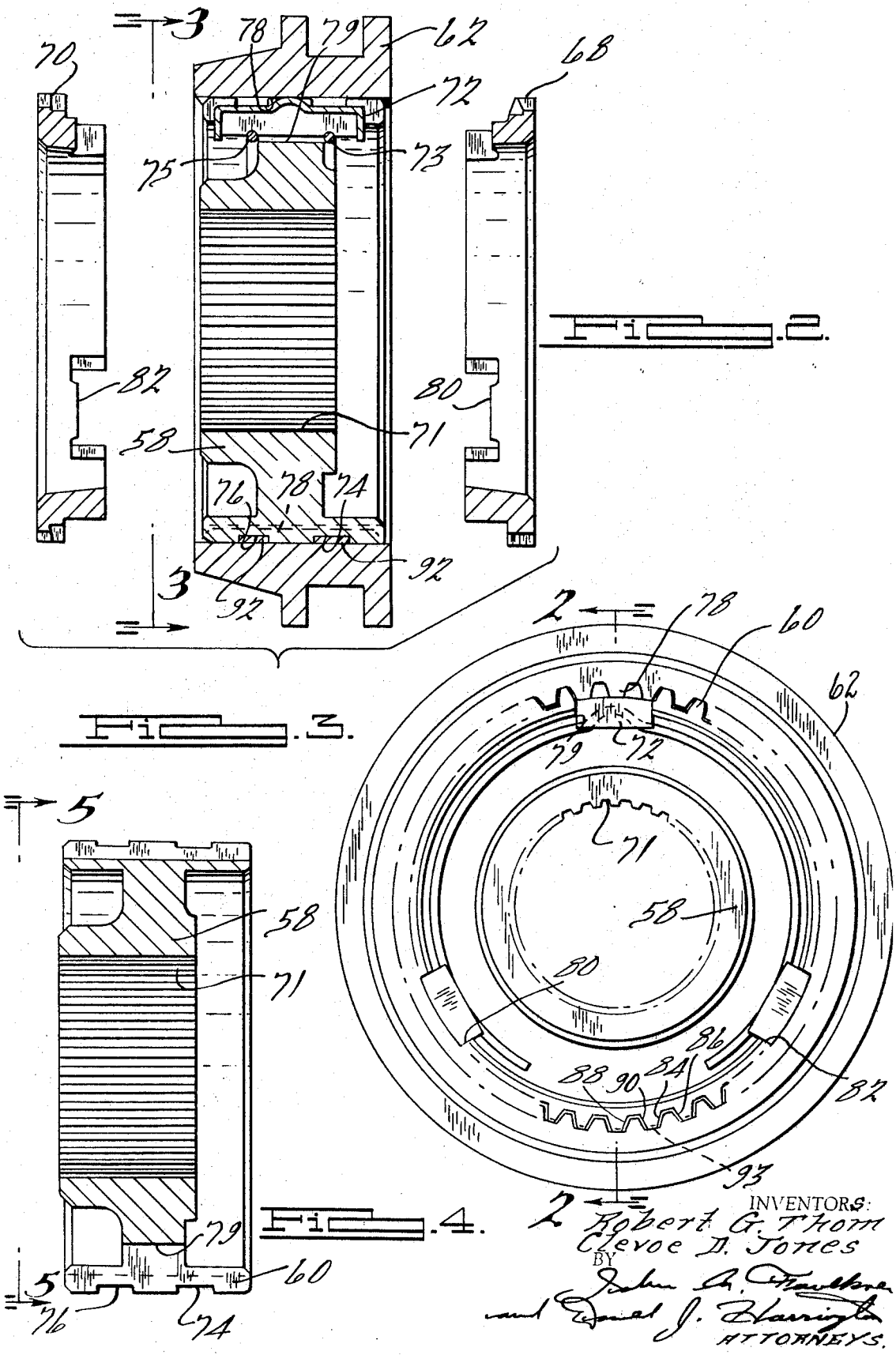

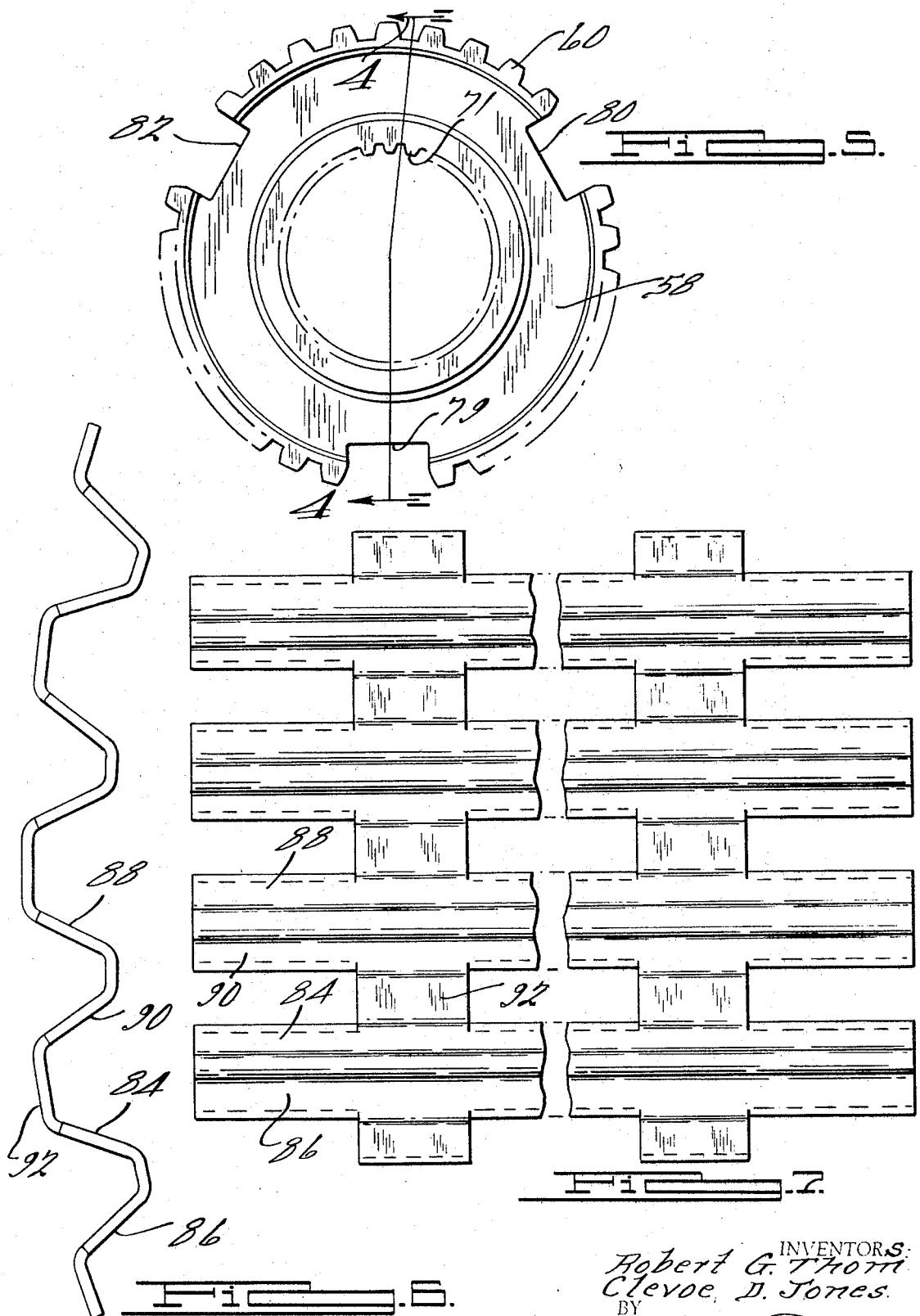

3,523,598
ANCHOR TOOTH SPLINE FOR ROTATABLE
TORQUE DELIVERY ELEMENT
Robert G. Thom, Detroit, and Clevoe D. Jones, Franklin, Mich., assignors to Ford Motor Company, Dearborn, Mich., a corporation of Delaware
Filed July 22, 1968, Ser. No. 746,559
Int. Cl. F16d 11/04; F16h 3/38, 55/18
U.S. Cl. 192—53                                        3 Claims

ABSTRACT OF THE DISCLOSURE

A spline assembly comprising a torque delivery element with external spline teeth that register with a sleeve with internal spline teeth, the effective conjugate profiles of the internal teeth and the external teeth being modified by a shim insert that increases the effective thickness of a portion of the external teeth whereby substantially the entire torque distribution between the sleeve and the torque delivery element occurs through the modified teeth, the remaining teeth acting as pilot members for the sleeve whereby skewing of the sleeve with respect to the axis of the torque delivery element is avoided.

GENERAL DESCRIPTION OF THE INVENTION

Our invention is adapted especially to be used in manually controlled, multiple ratio, power transmission mechanisms in automotive vehicle drivelines. One transmission mechanism to which the invention may be applied comprises a countershaft and a cluster gear assembly having gear elements that mesh with ratio changing gears situated for rotation about the common axis of the power input shaft and the power output shaft. The power input shaft is connected drivably to a power input gear which meshes with a first gear element of the cluster gear assembly. An intermediate ratio gear is journalled about the common shaft axis, and it meshes continuously with a second gear element of the cluster gear assembly. A synchronizer clutch structure is adapted to connect drivably either one gear or the other to the power output shaft, thereby establishing either an intermediate speed ratio or a high speed, direct drive ratio.

A low speed ratio gear is slidably splined on an intermediate portion of the output shaft so that it can be selectively engaged and disengaged with respect to a low speed gear element of the cluster gear assembly. This same low speed ratio gear forms also a portion of the reverse torque delivery path.

The synchronizer clutch assembly comprises a hub that is splined to an intermediate portion of the power output shaft. It is formed with external spline teeth. A synchronizer clutch sleeve is slidably splined to the external spline teeth of the hub. The power input gear and the intermediate speed ratio gear are formed with positive engagement clutch teeth, which are adapted to register with the internal teeth of the spline when the latter are shifted in one direction or the other. The synchronizer blocker rings are located between the clutch sleeve and the clutch teeth formed on the input gear. The blocker rings inhibit the clutching engagement of the sleeve and the spline teeth when the speed of rotation of the output shaft is out of synchronism with respect to the speed of rotation of the associated gear.

Inaccuracies in the profiles of the conjugate spline teeth of the hub and sleeve, pitch diameter runout, and lead errors tend to produce a skewing action of the sleeve with respect to the axis of the input shaft as torque is delivered through the sleeve. Thus when the sleeve is in clutching engagement with either the input gear or the intermediate speed ratio gear, it is possible for the sleeve to jump out of engagement during torque delivery. This problem is especially serious during torque reversals, such as those that occur during coasting operation of the vehicle.

To avoid this skewing action or clutch jump-out problem, we have provided an anchor tooth insert for the synchronizer hub which increases the effective tooth thickness of a limited number of external spline teeth on the hub. All of the torque delivered to the sleeve through the hub, therefore, passes through the modified teeth while the remaining teeth act as pilots. The insert is in the form of a shim having separate shank portions that engage the sides of the external spline teeth, each shank portion being connnected together by a band passing in a peripheral direction over the hub. The periphery of the hub is provided with annular recesses to accommodate the bands thereby avoiding interference with the sleeve and allowing the sleeve to move freely over the hub from one clutching position to another.

It is an object of this invention to eliminate the skewing action normally associated with the torque delivery elements, such as synchronizer clutch splines, by modifying selected spline teeth without the necessity for employing special broaching operations. It is an object also to provide an anchor tooth assembly of the type above described wherein certain teeth may form pilots for the sleeve while all the torque is delivered through other teeth, and wherein a conventional machining operation for the spline teeth may be used, all of the teeth being of uniform dimension.

BRIEF DESCRIPTION OF THE FIGURES OF THE DRAWINGS

FIG. 1 shows in longitudinal cross section a manually controlled power transmission mechanism capable of embodying a synchronizer assembly having the improved spline clutch teeth of our invention.

FIG. 2 shows a partial assembly view of the synchronizer clutch mechanism of the gearing of FIG. 1. It is taken along the plane of section line 2—2 of FIG. 3.

FIG. 3 is a side elevation view of the structure of FIG. 2 as seen from the plane of section line 3—3 of FIG. 2.

FIG. 4 is a cross sectional view of the synchronizer clutch hub used in the FIG. 1 construction. It is taken along the plane of section line 4—4 of FIG. 5.

FIG. 5 is a side elevation view of the FIG. 4 construction as seen from the plane of section line 5—5 of FIG. 4.

FIG. 6 is an end view of the shim insert used with the synchronizer clutch hub of FIGS. 4 and 5.

FIG. 7 is a plan view of the shim of FIG. 6.

PARTICULAR DESCRIPTION OF THE INVENTION

In FIG. 1, numeral 10 designates a power transmission housing which is formed with a forward wall 12 and a rear wall 14. A neutral clutch support sleeve 16 is secured to a forward wall 12 by means of a flange 18 and bolts 20. Sleeve 16 receives power input shaft 22 which is journalled by bearing 24 received in a bearing opening in forward wall 12. Shaft 22 is connected directly to power input gear 26.

An intermediate shaft is shown at 28. It forms an extension of the output shaft 30, which is journalled by bearing 32 in a bearing opening formed in transmission tailshaft extension housing 34. The housing is bolted to the inner wall 14.

The inboard end of the shaft 28 is formed with a reduced diameter pilot portion 36 which is journalled in pilot recess 38. Journalled on shaft 28 is an intermediate gear 40. A helical spline 42 is formed on the shaft 28 adjacent gear 40. A low-and-reverse gear 44 having internal helical splines is carried by the spline portion 42. The spline teeth form a driving connection between the shaft 28 and the gear 44, although the gear 44 can be shifted axially.

A cluster gear assembly is shown at 46. It includes a main gear element 48, an intermediate speed gear element 50, a low speed gear element 52 and a reverse gear element 54. The gear elements of the clutch gear assembly rotate in unison. They are journalled on countershaft 55 which is end supported in openings 58 and 60 in the forward wall 12 and in the rearward wall 14, respectively.

The low speed ratio is achieved by moving gear 44 in a left-hand direction so that it meshes with gear element 52. Engine torque then is delivered from shaft 22 and through gear 26 to the cluster gear assembly. Gear element 52 drives gear 44 and shaft 30 at a reduced ratio.

Reverse drive is achieved by moving gear 44 in a right-hand direction until it meshes with a reverse drive pinion, not shown. This pinion in turn meshes with gear element 54. Reverse driving torque is distributed then from shaft 22, through the gear 26 and through the cluster gear assembly to the reverse drive pinion, which in turn drives the gear 44 in a reverse direction.

Intermediate shaft 28 is splined at 56 to receive an internally splined synchronizer clutch hub 58. This hub, which is a driven member during driving torque delivery is formed with external spline teeth as indicated, for example, in FIGS. 3 and 5, at 60. An internally splined synchronizer clutch sleeve 62, which is a driving member during driving torque delivery, is connected to the hub 58. The sleeve 62 may be moved by a shift fork either in one axial direction or the other. If it is moved in a right-hand direction, clutching engagement may occur between the internal spline teeth of the sleeve 62 and external clutch teeth 64 formed on gear 40. If it is moved in a left-hand direction, clutching engagement may occur between the internal spline teeth of sleeve 62 and external clutch teeth 66 formed on gear 26.

A synchronizer blocker ring 68 is situated between the hub 58 and the clutch teeth 64. It is formed with external clutch teeth which are located in the path of movement of the internal clutch teeth of the sleeve 62. Ring 68 is formed with an internal cone clutch surface, which registers with an external cone clutch surface carried by gear 40.

In a similar fashion a second synchronizer clutch blocker ring 70 is located between the clutch teeth 66 and the hub 58. It also is formed with external teeth situated in the path of movement of the internal teeth of the sleeve 62. It is provided with an internal cone clutch surface which registers with an external cone clutch surface formed on the gear 26. Three angularly spaced thrust bars 72 are received in radial slots formed in the hub 58. These bars are urged radially outwardly by detent springs 73 and 75. A detent projection is formed on each thrust bar 72 which is adapted to register with an annular groove 78 formed in the inner spline surface of the sleeve 62.

As indicated best in FIG. 2, each synchronizer blocker ring 68 and 66 is formed with axially extending openings shown at 80 and 82, respectively, for receiving the end of the thrust bars. A limited degree of angular lost motion may take place between the hub and the blocker rings.

As the sleeve 62 is shifted in a right-hand direction, the detent action of the thrust bars 72 urge the blocker rings into clutching engagement with the gear 40, thereby tending to establish synchronism in the motion of the gear 40 with respect to the shaft 28. After synchronism is established, the sleeve 62 can be moved into clutching engagement with the teeth 64.

If the sleeve 62 is moved in a left-hand direction, the detent action of the thrust bars will establish clutching engagement of the synchronizer ring 7 with respect to the gear 26, thereby tending to establish synchronism in the motion of gear 26 with respect to the shaft 28. After synchronism is established, the sleeve 62 can be moved into clutching engagement with the clutch teeth 66 as the internal teeth of the sleeve 62 pass through the blocker ring teeth.

If the sleeve 62 is shifted in a right-hand direction, the transmission mechanism is in condition for intermediate speed ratio operation. Driving torque then is delivered from shaft 22 and through gear 26, gear element 48, gear element 50 and gear 40 to the shaft 28. High speed ratio, third speed operation is attained by shifting the sleeve 62 into engagement with the teeth 66 thereby locking the shaft 22 to the shaft 28. The synchronizer clutch hub 58, as shown in FIGS. 4 and 5, includes internal splines 71 which register with external splines 56. The outer periphery of the hub 58 is provided with a pair of peripheral grooves 74 and 76 formed in the spline teeth 60. A shim insert, which is shown in FIGS. 6 and 7, registers with the teeth 60 at a location intermediate the slots within which the thrust bars 72 are located. The slots are identified in FIG. 5 with reference characters 79, 80 and 82. FIG. 3 shows the assembled position of the shim on the teeth 60.

The shim comprises V-shaped, recessed portions, one portion having a pair of sides 84 and 86 which engage the tooth flanks on each of two adjacent spline teeth 60 which define a cooperating tooth space. In FIG. 6 the sides of the adjacent recessed portion are identified by reference characters 88 and 90. A strap or bridge portion 92 connects together the side portions 84 and 90 of the adjacent V-shaped portions. Corresponding bridges or straps link together each of the other V-shaped recessed portions as indicated.

The axial dimension of the straps 90 seen in FIG. 3 is substantially less than the axial dimension of the pair of sides 84 and 86 and each of the other pairs of sides for the recessed regions.

The straps are received in recesses 76 and 74 in the periphery of the hub 58 so that they will not interfere with axial sliding movement of the clutch sleeve as sliding action occurs between the root of the external teeth of sleeve 62 and the tooth tips of the teeth of hub 58. The sides 84 and 86 and the corresponding sides of the other recessed regions enlarge the effective tooth thickness of the teeth 60 at one location on the periphery of the hub 58. This effective tooth width is substantially equal to the tooth space between the corresponding adjacent teeth of the sleeve so that a clearance will exist between the teeth of the sleeve and each of the other teeth of the hub. Thus the shim teeth effectively transfer all the torque between the sleeve and the hub when the transmission system is operated under torque. Because of this and because of the piloting action of the remaining teeth, the sleeve will not undergo a skewing action, which normally would tend to cause the sleeve to creep along the hub. It is this skewing action and the accompanying creep that normally would cause a gear "jump-out" of the type previously described.

The use of shim stock to alter the effective tooth thickness for selected spline teeth of the hub eliminates the necessity for using special bobbing or broaching operations in formation of the splines since all of the spline teeth are identical.

Having just described a preferred form of our invention, what we desire to secure by U.S. Letters Patent is:

1. A torque delivery mechanism comprising a driving member and a driven member, external spline teeth formed on one of said members, clutch teeth formed on the other of said members, an internally splined sleeve received over said one member and having internal spline teeth registering with said spline teeth, said sleeve being movable axially whereby its internal teeth register with the clutch teeth of said other member, a shim insert received over the external spline teeth and having a selected number of recessed portions registering with the tooth space of said external teeth, each portion having sides that register with the tooth flanks of the adjacent external spline teeth, and means for connecting said recessed portions together, said sides altering the effective tooth width of said external spline teeth thereby anchoring said sleeve and preventing skewing of said sleeve with respect to the axis of said one member as torque is delivered between said driving member and said driven member, the connecting means for said recessed portions comprising a strap extending peripherally with respect to the external spline teeth and joining said sides at an intermediate location thereon, the teeth of said one member being formed with at least one peripheral groove which is adapted to receive said strap whereby said shim is held fast against axial displacement as said sleeve moves relatively to said one member.

2. The combination as set forth in claim 1 wherein the teeth of said one member and the teeth of said spline have a predetermined clearance therebetween, the clearance between said external spline teeth and the surrounding sleeve teeth being substantially eliminated by said insert as a sliding fit is established between the tooth tips of one group of spline teeth with respect to the root of the companion group of spline teeth.

3. The combination as set forth in claim 2 wherein the teeth of said one member and the teeth of said spline have a predetermined clearance therebetween, the clearance between said external spline teeth and the surrounding sleeve teeth being substantially eliminated by said insert as a sliding fit is established between the tooth tips of one group of spline teeth with respect to the root of the companion group of spline teeth.

References Cited
UNITED STATES PATENTS

| | | | |
|---|---|---|---|
| 3,191,735 | 6/1965 | Wavak | 74—409 XR |
| 3,355,909 | 12/1967 | Russey et al. | |
| 3,373,625 | 3/1968 | Keller | 74—409 |

MARK M. NEWMAN, Primary Examiner

A. D. HERRMANN, Assistant Examiner

U.S. Cl. X.R.

74—339, 409; 192—110